United States Patent [19]

Imoto et al.

[11] Patent Number: 5,206,003
[45] Date of Patent: Apr. 27, 1993

[54] METHOD OF DECOMPOSING FLON

[75] Inventors: Yoshinori Imoto; Katsunosuke Hara, both of Aichi; Masakatsu Hiraoka, 39-763, Kohata Okurayama, Uji City, Kyoto-Fu, all of Japan

[73] Assignees: NGK Insulators, Ltd.; Masakatsu Hiraoka, both of Japan

[21] Appl. No.: 803,903

[22] Filed: Dec. 9, 1991

Related U.S. Application Data

[63] Continuation of Ser. No. 547,041, Jul. 2, 1990, abandoned.

[30] Foreign Application Priority Data

Jul. 7, 1989 [JP] Japan .................. 1-176012

[51] Int. Cl.$^5$ .................. C01B 7/01; C01B 7/19; C01B 7/24
[52] U.S. Cl. .................. 423/240 S; 423/481; 423/483
[58] Field of Search .................. 423/659, 240 S, 481, 423/483

[56] References Cited

U.S. PATENT DOCUMENTS

| | | | |
|---|---|---|---|
| 3,469,934 | 9/1969 | Bocard et al. | 23/4 |
| 3,845,191 | 10/1974 | Bruce | 423/490 |
| 3,972,979 | 8/1976 | Kageyama | 423/481 |
| 4,039,623 | 8/1977 | Lavanish et al. | 423/481 |
| 4,053,556 | 10/1977 | Acres | 423/239 |
| 4,053,557 | 10/1977 | Kageyama | 423/240 |
| 4,059,675 | 11/1977 | Yang et al. | 423/481 |
| 4,059,676 | 11/1977 | Yang et al. | 423/481 |
| 4,059,683 | 11/1977 | Lindberg et al. | 423/481 |

FOREIGN PATENT DOCUMENTS 1500647  2/1978  United Kingdom .

OTHER PUBLICATIONS

Chemistry Letters, No. 11, Nov. 1989, pp. 1901–1904, The Chemical Society of Japan, S. Okazaki et al.
Chemical Abstracts, vol. 84, No. 6, Feb. 9, 1976, p. 273, Abstract No. 34982w.
Environmental Pollutions and Counterplans, vol. 25, No. 15 (1989) pp. 1489–1495.

*Primary Examiner*—Wayne Langel
*Attorney, Agent, or Firm*—Parkhurst, Wendel & Rossi

[57] ABSTRACT

An excellent method of decomposing flon is provided which can decompose flon economically with high decomposition efficiency without necessitating high temperature and high pressure by contacting a gas containing a flon with a catalyst at a condition of a temperature of not less than 200° C. and space velocity of not over than 50,000 (hr$^{-1}$).

9 Claims, 2 Drawing Sheets

METHOD OF DECOMPOSING FLON

This is a Continuation of application Ser. No. 07/547,041 filed Jul. 2, 1990, now abandoned.

BACKGROUND OF THE INVENTION

1. Field of the Invention

The present invention relates to a method of treating flon, more particularly a method of decomposing flon.

2. Related Art Statement

Heretofore, flon is said to be a cause of worsening of the environment of the earth, because if it is discharged in the air it flows into the ozone layer and is decomposed by the ultraviolet ray from the sun to generate active chlorine atoms which destruct the ozone layer. Therefore, development of a technique of decomposing flon is earnestly desired, in addition to development of a substitute of flon.

Heretofore known techniques of decomposing flon are a pressurized combustion method of combusting and decomposing flon under pressure in a sealed vessel and a super critical water method of mixing an aqueous solution of flon with super pure water and reacting the same under a condition of a temperature of about 400° C. and a pressure of about 360 atm.

In the pressurized combustion method, there is a problem in that the temperature and the pressure for the combustion have to be elevated above an usual condition of a temperature of about 800–900° C. and an ambient pressure required for combusting usual substances, in order to improve decomposition efficiency. Meanwhile, in the super critical water method, there is a problem in that a very high investment cost is required for maintaining the high pressure condition.

SUMMARY OF THE INVENTION

An object of the present invention is to solve the above problems.

Another object of the present invention is to provide a method of decomposing flon which can decompose flon economically with a high decomposition efficiency at around the usual condition required for combusting usual substances.

In an effort of achieving the above objects, the inventors made man researches and experiments to accomplish the present invention.

The present invention is characterized by decomposing flon by contacting a gas containing a flon with a catalyst at a condition of a temperature of not less than 200° C. and a space velocity of not over than 50,000 $(hr^{-1})$.

The reason why the temperature is limited to not less than 200° C. or higher is that the decomposition of flon by oxidation becomes insufficient at a temperature of less than 200° C., as shown in the later described Example 1. Preferably, the decomposition is effected at a temperature of 400–600° C. In this temperature range, the efficiency of decomposition of flon by oxidation reaches a peak. At temperatures above 600° C., good decomposition efficiency can be obtained, however, improvement of the decomposition efficiency can not be expected and the cost of energy for elevating the decomposition temperature is vainly increased.

The reason why the space velocity (SV) is limited to not over than 50,000 $(hr^{-1})$ is because the contacting time of the catalyst and the gas containing flon becomes insufficient, so that the decomposition efficiency is decreased, if the SV is over 50,000 $(hr^{-1})$. Though the space velocity has no lower limit with no particular problem as regard the efficiency, the amount of the catalyst is vainly increased to increase the catalyst cost, if the space velocity is below 2,000 $(hr^{-1})$. Therefore, the space velocity is preferably within a range of 2,000–20,000 $(hr^{-1})$.

Types and shapes of the catalyst are not restricted to specific ones. However, the catalyst is preferably selected and used from the oxides of metals consisting of Pt, Rh, Pd, Ru, Mn, Cu, Cr, Fe, and mixtures thereof. In addition, use of a catalyst consisting of components A and B is effective, the component A being a single oxide of a metal selected from the group consisting of Zr, Ti, Al, W and Si or a complexed multi oxide of at least two metals selected from the group consisting of Zr, Ti, Al, W and Si, and the component B being a metal or metals selected from the group consisting of Pt, Rh, Pd, Ru, Mn, Cu, Cr and Fe, an oxide or oxides thereof. Especially, the use of the latter catalyst is preferable in that the catalyst per se has acidic property and exhibits a remarkable resistance to acid and can decompose and remove flon gas efficiently for a long period in the presence of Hf, HCl, etc., which are produced by decomposition of the flon gas.

If a carrier of $ZrO_2$-$TiO_2$ or $ZrO_2$-$TiO_2$-$Al_2O_3$ system of a large specific surface area of at least 10 $m^2/g$ is used as a catalyst carrier, a high catalytic activity can be exhibited even at low temperatures as shown in the later described Examples, and a good property of decomposing and removing flon can be exhibited even at high space velocities. In addition, the catalyst carrier can be prepared so easily that it can be formed into any shape, such as, pellet, plate, cylinder, lattice, honeycomb or the like. Moreover, the catalyst carrier has distinguished mechanical and physical properties, such as crush strength, wear resistance, shutter strength and the like, so that it can be used stably for a long time.

Zr source material for preparing the catalyst carriers, such as, $ZrO_2$-$TiO_2$ system carrier, can be selected from inorganic Zr compounds and organic Zr compounds. Preferable inorganic Zr compounds are, for example, zirconyl nitrate, zirconyl sulfate, zirconyl oxalate. Ti source material for preparing the catalyst carriers $ZrO_2$-$TiO_2$, etc., can be selected from inorganic titanium compounds, such as, titanium chloride, titanium sulfate, and the like, and organic titanium compounds, such as, titanium oxalate, tetraisopropyl titanate, and the like.

Shape of the catalyst carrier is not restricted to specific ones. Integral honeycomb structural bodies having an equivalent diameter of throughholes of not over than 30 mm and an open porosity of not less than 50%, are particularly preferable. This is because the honeycomb structural bodies can decrease the pressure loss of the catalyst carriers and achieve high decomposition efficiencies even at high space velocities. However, if the equivalent diameter of the throughholes exceeds 30 mm, the efficiency of removing flon is decreased. Also, if the open porosity is less than 50%, the pressure loss of the catalyst carriers becomes high.

As a decomposing aid, use of $CH_4$ or $H_2O$ is effective. The present invention is not especially restricted to the use and the type of the decomposing aid. However, if the content of flon in the flon containing gas is high, injection of $CH_4$, $H_2O$, or $C_6H_6$, etc., is effective in decomposing flon.

BRIEF DESCRIPTION OF THE DRAWINGS

For a better understanding of the present invention, reference is made to the accompanying drawings, in which.

DESCRIPTION OF THE PREFERRED EMBODIMENTS

Hereinafter, the present invention will be explained in more detail with reference Examples.

EXAMPLE 1

Figure 1:
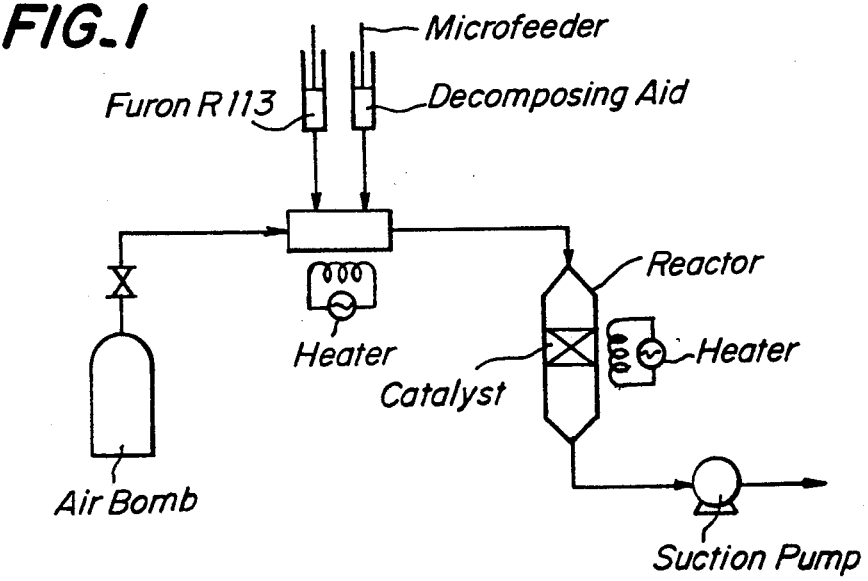
FIG. 1 is a flow sheet of an embodiment of the process for carrying out the present invention into effect.

Using an experimental apparatus of the flow sheet as shown in FIG. 1 and a finished catalyst prepared by supporting Pt on a honeycomb shaped carrier composed of a complexed oxides of Zr:Ti=8.5:1.5 (mole ratio) and having a pore opening of 2.0 mm and a partition wall thickness of 0.4 mm in an amount of 1.5 g of Pt per 1 l of the carrier, decomposition of an exhaust gas containing flon R113 is effected under the conditions as shown in the following Table 1 to obtain the results as shown in Table 1.

Figure 2:
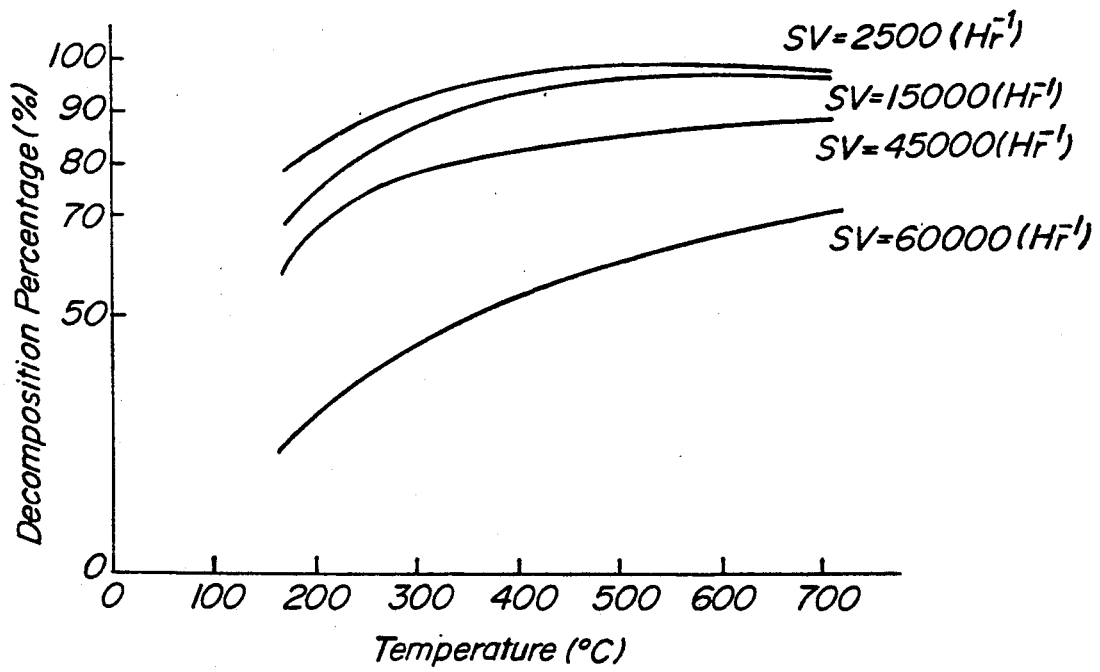
FIG. 2 is a graph of characteristic curves showing relations between treating temperature and decomposition percentage of flon taking space velocity as a parameter.

Relation between the treating temperature and the decomposition percentage is shown in FIG. 2.

As seen from Table 1 and FIG. 2, good decomposition percentage can be obtained, if the treating temperature is not less than 200° C. and the space velocity SV is not over 50,000 ($hr^-$).

TABLE 1

| No. | Temperature °C. | Catalyst type | SV ($hr^{-1}$) | Flon R113 concentration at inlet (ppm) | Decomposition percentage (%) | Evaluation |
| --- | --- | --- | --- | --- | --- | --- |
| 1 | 200 | metal | 2,500 | 500 | 84 | ○ |
| 2 | 300 | metal | 2,500 | 500 | 93 | ⊚ |
| 3 | 400 | metal | 2,500 | 500 | 98 | ⊚ |
| 4 | 500 | metal | 2,500 | 500 | 99 | ⊚ |
| 5 | 600 | metal | 2,500 | 500 | 99+ | ⊚ |
| 6 | 700 | metal | 2,500 | 500 | 99+ | ⊚ |
| 7 | 200 | metal | 15,000 | 500 | 74 | Δ |
| 8 | 300 | metal | 15,000 | 500 | 89 | ○ |
| 9 | 400 | metal | 15,000 | 500 | 94 | ⊚ |
| 10 | 500 | metal | 15,000 | 500 | 97 | ⊚ |
| 11 | 600 | metal | 15,000 | 500 | 98 | ⊚ |
| 12 | 700 | metal | 15,000 | 500 | 99 | ⊚ |
| 13 | 200 | metal | 45,000 | 500 | 70 | Δ |
| 14 | 300 | metal | 45,000 | 500 | 78 | Δ |
| 15 | 400 | metal | 45,000 | 500 | 83 | ○ |
| 16 | 500 | metal | 45,000 | 500 | 87 | ○ |
| 17 | 600 | metal | 45,000 | 500 | 89 | ○ |
| 18 | 700 | metal | 45,000 | 500 | 90 | ⊚ |
| 19 | 200 | metal | 60,000 | 500 | 30 | X |
| 20 | 300 | metal | 60,000 | 500 | 44 | X |
| 21 | 400 | metal | 60,000 | 500 | 54 | X |
| 22 | 500 | metal | 60,000 | 500 | 61 | X |
| 23 | 600 | metal | 60,000 | 500 | 67 | X |
| 24 | 700 | metal | 60,000 | 500 | 72 | Δ |
| 25 | 500 | metal | 2,500 | 2,000 | 99+ | ⊚ |
| 26 | 500 | metal | 15,000 | 2,000 | 99+ | ⊚ |
| 27 | 500 | metal | 2,500 | 5,000 | 99+ | ⊚ |
| 28 | 500 | metal | 15,000 | 5,000 | 99+ | ⊚ |

[Decomposition percentage] [Evaluation]
90% + ⊚
80~89% ○
70~79% Δ
69% − X

EXAMPLE 2

Decomposition tests of an exhaust gas containing flon R113 are effected under the following condition to obtain the results as shown in Table 2 below.
(Condition)
Gas composition: 500 ppm of flon R113, the rest of air
Space velocity: 2,500 $hr^{-1}$
Temperature: 500° C.
Catalyst type:
 Catalyst A: Pt
 Catalyst B: Pt+Rh+Pd
 Catalyst C: Pt+Rh+Pd+Ru+Mn+Cu
 Catalyst D: Pt+Rh+Pd+Ru+Mn+Cu+Cr+Fe
 Catalyst E: Ni
 Catalyst F: Ce
 Catalyst G: V
Amount of the catalyst total 1.5 g/carrier 1 l

TABLE 2

| No. | Temperature °C. | Catalyst type | SV ($hr^{-1}$) | Decomposition percentage (%) | Evaluation |
| --- | --- | --- | --- | --- | --- |
| 1 | 500 | A | 2,500 | 99 | ⊚ |
| 2 | 500 | B | 2,500 | 99+ | ⊚ |
| 3 | 500 | C | 2,500 | 99+ | ⊚ |
| 4 | 500 | D | 2,500 | 99+ | ⊚ |
| 5 | 500 | E | 2,500 | 10 | X |
| 6 | 500 | F | 2,500 | 14 | X |
| 7 | 500 | G | 2,500 | 8 | X |

As seen from Table 2, good decomposition percentages can be obtained by the use of the catalyst selected from Pt, Rh, Pd, Ru, Mn, Cu, Cr and Fe.

EXAMPLE 3

Figure 3:
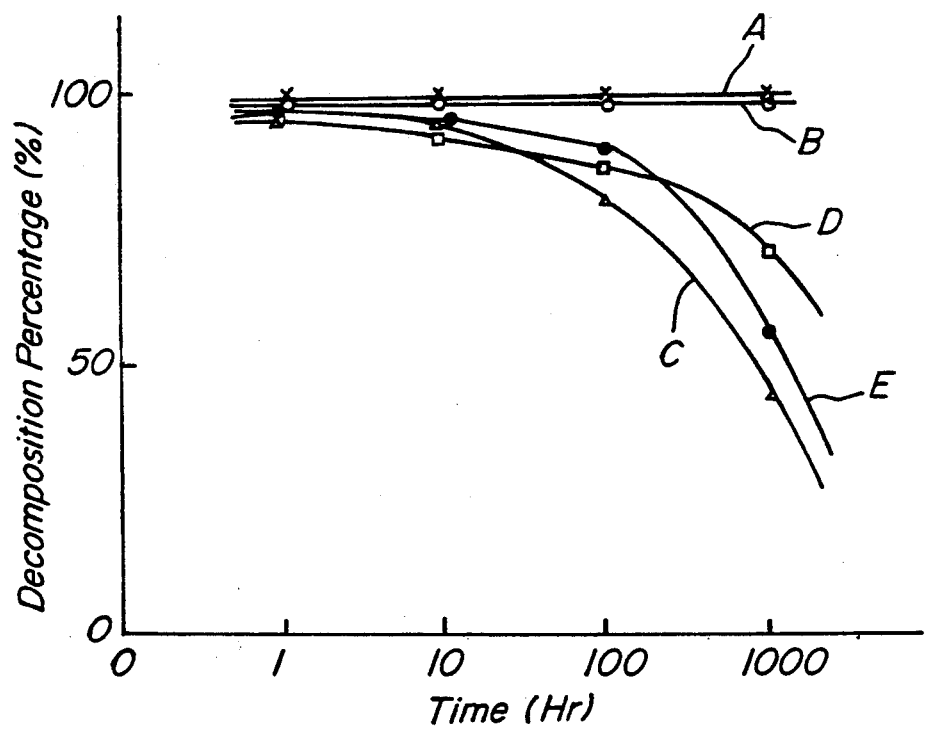
FIG. 3 is a graph showing relations between use time of various catalysts and decomposition percentage.

Using a honeycomb shaped body supporting Pt (1.5 g/1 l of carrier), decomposition tests of an exhaust gas containing flon R113 are effected under the following condition to obtain the results as shown in FIG. 3.
(Condition)
Gas composition: 500 ppm of flon R113, the rest of air
Space velocity: 2,500 $hr^{-1}$
Temperature: 500° C.
Carrier
 Carrier A: Zr: Ti=7:3 (mole ratio)
 Carrier B: Ti: Si=7:3 (mole ratio)
 Carrier C: mullite type
 Carrier D: cordierite type
 Carrier E: zeolite As seen from FIG. 3, the catalyst can withstand use for a long period, if a carrier is used which is not deteriorated easily by fluoric acid, hydrochloric acid, and the like which are generated after the decomposition of the flon substance.

EXAMPLE 4

Using a honeycomb shaped body as the carrier for the catalyst, decomposition tests of an exhaust gas are effected under the following conditions to obtain the results as shown in FIG. 3.

(Condition)
Gas composition: 500 ppm of flon R113, the rest of air
Space velocity: 2,500 hr$^{-1}$
Temperature: 500° C.

TABLE 3

| No. | Equivalent diameter of through holes (mm) | Open porosity (%) | Pressure loss (mmH$_2$O) | Decomposition percentage (%) | Evaluation |
| --- | --- | --- | --- | --- | --- |
| 1 | 1.6 | 64 | 15 | 99 | ○ |
| 2 | 2.0 | 69 | 18 | 99 | ○ |
| 3 | 2.0 | 51 | 34 | 87 | ○ |
| 4 | 2.0 | 44 | 293 | 71 | X |
| 5 | 5.0 | 67 | 16 | 91 | ○ |
| 6 | 5.0 | 51 | 74 | 82 | ○ |
| 7 | 5.0 | 39 | 240 | 63 | X |
| 8 | 15 | 62 | 13 | 83 | ○ |
| 9 | 15 | 51 | 64 | 74 | ○ |
| 10 | 15 | 42 | 163 | 61 | X |
| 11 | 30 | 73 | 11 | 78 | ○ |
| 12 | 30 | 56 | 95 | 70 | ○ |
| 13 | 50 | 69 | 8 | 52 | X |

[Evaluation]
X Decomposition percentage is less than 70% or pressure loss is 150 mmH$_2$O or higher
○ Decomposition percentage is 79% or higher and the pressure loss is less than 150 mmH$_2$O As seen from Table 3, if a honeycomb shaped body having an equivalent diameter of throughholes of not over than 30 mm and an open porosity of not less than 50% is used as the catalyst carrier, good decomposition percentages can be obtained with low pressure loss.

As clearly apparent from the foregoing explanations, the present invention does not necessitate the condition of high temperature and high pressure and can decompose flon economically with high decomposition efficiency at around a condition of combusting usual substances, so that the energy cost can be reduced considerably and a high cost expensive apparatus can be dispensed with.

Accordingly, the present invention obviates the prior problems and contributes in a great deal to the development of the industry.

Although the present invention has been explained with specific examples and numeral values, it is of course apparent to those skilled in the art that various changes and modifications thereof are possible without departing from the broad spirit and aspect of the present invention as defined in the appended claims.

What is claimed is:

1. A method of decomposing flon, comprising contacting a gas containing flon with a catalyst at a temperature of 200–700° C. and a space velocity of 2,000 to 50,000 (hr$^{-1}$), the catalyst being selected from the group consisting of Rh, Pd, Mn, and Cu and an oxide or oxides thereof.

2. The method of claim 1, wherein the catalyst uses a carrier of an integral honeycomb type structural body having an equivalent diameter of throughholes of 30 mm or less and an open porosity of not less than 50%.

3. The method of claim 1, wherein the temperature is 400–600° C.

4. The method of claim 1, wherein the space velocity is 2,000–20,000 (hr$^{-1}$).

5. The method of claim 1, wherein the catalyst uses a carrier of a specific surface area of at least 10 m$^2$/g selected from the group consisting of ZrO$_2$-TiO$_2$ and ZrO$_2$-TiO$_2$-Al$_2$O$_3$.

6. A method of decomposing flon, comprising contacting a gas containing flon with a catalyst at a temperature of 200–700° C. and a space velocity of 2,000–50,000 (hr$^{-1}$), the catalyst consisting of components A and B, the component A being a single oxide of a metal selected from the group consisting of Zr, Ti, and W or a complexed multi oxide of at least two metals selected from the group consisting of Zr, Ti, Al, W and Si, and the component B being a metal or metals selected from the group consisting of Pt, Rh, Pd, Ru, Mn, Cu, Cr, and Fe, and an oxide or oxides thereof.

7. The method of claim 6, wherein the catalyst uses a carrier of a specific surface area of at least 10 m$^2$/g selected from the group consisting of ZrO$_2$-TiO$_2$ and ZrO$_2$-TiO$_2$-Al$_2$O$_3$.

8. The method of claim 6, wherein the catalyst uses a carrier of an integral honeycomb type structural body having an equivalent diameter of throughholes of 30 mm or less and an open porosity of not less than 50%.

9. The method of claim 6, wherein the temperature is 400–600° C.

* * * * *

UNITED STATES PATENT AND TRADEMARK OFFICE
CERTIFICATE OF CORRECTION

PATENT NO. : 5,206,003
DATED : April 27, 1993
INVENTOR(S) : Yoshinori IMOTO et al.

It is certified that error appears in the above-identified patent and that said Letters Patent is hereby corrected as shown below:

On title page, item [54], and col. 1, line 1, correct the spelling of "FLOW" in the title to --FLON--.

Signed and Sealed this

Eighteenth Day of January, 1994

Attest:

BRUCE LEHMAN

Attesting Officer          Commissioner of Patents and Trademarks